United States Patent
Clark et al.

(10) Patent No.: US 11,561,296 B2
(45) Date of Patent: Jan. 24, 2023

(54) SYSTEM AND METHOD FOR ADAPTIVELY CONFIGURING DYNAMIC RANGE FOR ULTRASOUND IMAGE DISPLAY

(71) Applicant: KONINKLIJKE PHILIPS N.V., Eindhoven (NL)

(72) Inventors: David Wesley Clark, Derry, NH (US); Francois Guy Gerard Marie Vignon, Andover, MA (US); Darwin Philip Adams, Lexington, MA (US); Roy Allan Sivley, Waltham, MA (US); Kirthi Radhakrishnan, Andover, MA (US)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 17/458,927

(22) Filed: Aug. 27, 2021

(65) Prior Publication Data

US 2021/0389438 A1  Dec. 16, 2021

Related U.S. Application Data

(63) Continuation of application No. 16/958,805, filed as application No. PCT/EP2018/086491 on Dec. 21, 2018, now Pat. No. 11,105,907.

(Continued)

(51) Int. Cl.
*G01S 7/52* (2006.01)
*G01S 15/89* (2006.01)

(52) U.S. Cl.
CPC ........ *G01S 7/5206* (2013.01); *G01S 7/52069* (2013.01); *G01S 7/52071* (2013.01); *G01S 15/8993* (2013.01)

(58) Field of Classification Search
CPC .............. G01S 7/5206; G01S 7/52069; G01S 7/52071; G01S 15/8993; G01S 7/52033
See application file for complete search history.

(56) References Cited

U.S. PATENT DOCUMENTS

| | | | |
|---|---|---|---|
| 6,048,311 | A | 4/2000 | Washburn et al. |
| 6,352,511 | B1 | 3/2002 | Hossack et al. |

(Continued)

FOREIGN PATENT DOCUMENTS

| | | | | |
|---|---|---|---|---|
| CN | 111819465 | A | * 10/2020 | ......... G01S 15/8993 |
| CN | 111819465 | A | 10/2020 | |

(Continued)

OTHER PUBLICATIONS

International Search Report and Written Opinion for International Application No. PCT/EP2018/086491, filed Dec. 21, 2018, 16 pages.

(Continued)

*Primary Examiner* — Daniel Pihulic

(57) ABSTRACT

An ultrasound imaging system according to the present disclosure may include an ultrasound probe, a display unit, and a processor configured to receive source image data having a first dynamic range, wherein the source image data comprises log compressed echo intensity values based on the ultrasound echoes detected by the ultrasound probe, generate a histogram of at least a portion of source image data, generate a cumulative density function for the histogram, receive an indication of at least two points on the cumulative density function (CDF), and cause the display unit to display an ultrasound image representative of the source image data displayed in accordance with the second dynamic range.

20 Claims, 7 Drawing Sheets

Related U.S. Application Data

(60) Provisional application No. 62/611,893, filed on Dec. 29, 2017.

(56) References Cited

U.S. PATENT DOCUMENTS

| | | | |
|---|---|---|---|
| 7,062,714 | B1 | 6/2006 | Mo et al. |
| 11,105,907 | B2 * | 8/2021 | Clark ................ G01S 7/52071 |
| 2014/0177803 | A1 * | 6/2014 | Stevens .................... A61B 6/52 |
| | | | 378/98 |
| 2015/0348247 | A1 | 12/2015 | McLaughlin |
| 2017/0091915 | A1 | 3/2017 | McLaughlin et al. |
| 2021/0063552 | A1 * | 3/2021 | Clark ................ G01S 15/8993 |
| 2021/0248724 | A1 * | 8/2021 | Vignon .............. G01S 15/8906 |
| 2021/0389438 | A1 * | 12/2021 | Clark ................ G01S 15/8993 |

FOREIGN PATENT DOCUMENTS

| | | | | |
|---|---|---|---|---|
| CN | 112513673 | A * | 3/2021 | ......... G01S 15/8906 |
| EP | 1793343 | A1 | 6/2007 | |
| EP | 3732502 | A1 * | 11/2020 | ......... G01S 15/8993 |
| EP | 3732502 | A1 | 11/2020 | |
| EP | 3827281 | A1 * | 6/2021 | ......... G01S 15/8906 |
| JP | 7076554 | B2 * | 5/2022 | ......... G01S 15/8993 |
| JP | 2022110089 | A * | 7/2022 | ......... G01S 15/8993 |
| WO | 2015184300 | A1 | 12/2015 | |
| WO | 2019129685 | A1 | 7/2019 | |
| WO | WO-2019129685 | A1 * | 7/2019 | ......... G01S 15/8993 |

OTHER PUBLICATIONS

Rindal, et al., "The dynamic range of adaptive beamformers," 2016 IEEE International Ultrasonics Symposium Proceedings, 2016, 4 pages.

Mindray DC-8 2.0 Cardiovascular Brochure 20130418.pdf, p. 2 ("Echo Boost"), 4 pages (Abstract).

* cited by examiner

SYSTEM AND METHOD FOR ADAPTIVELY CONFIGURING DYNAMIC RANGE FOR ULTRASOUND IMAGE DISPLAY

CROSS-REFERENCE TO RELATED APPLICATIONS

This application is a continuation of U.S. application Ser. No. 16/958,805, filed Jun. 29, 2020, now U.S. Pat. No. 11,105,907, which is the U.S. National Phase application under 35 U.S.C. § 371 of International Application No. PCT/EP2018/086491, filed on Dec. 21, 2018, which claims priority to and the benefit of U.S. Provisional Application Ser. No. 62/611,893, filed Dec. 29, 2017. These applications are hereby incorporated by reference herein.

TECHNICAL FIELD

The present disclosure relates generally to ultrasound systems and methods for adjusting the dynamic range for display of ultrasound images, for example for B-mode and M-mode imaging.

BACKGROUND

In ultrasound B-mode (2D or 3D) or M-mode imaging, the echo intensity is generally log compressed for display. This creates an intuitive image, where echo intensity ratios are represented as brightness differences, and gain adjustments and speckle and noise variance are independent of echo amplitude. Generally, the displayed dynamic range is smaller than the full dynamic range of the echo signals, even after time-gain compensation (TGC). Pixels within the displayed dynamic range are typically shown as shades of gray, while pixels beyond the displayed dynamic range are shown as saturated white or black. For an aesthetically pleasing image, usually a significant fraction of the pixels are black or very dark, especially in cardiac or obstetric applications where a large fraction of the image represents fluid. Usually a relatively small fraction of pixels, sometimes none, are saturated white. The displayed dynamic range is applied with an offset ("Gain"), scale ("Compress"), and clip of the log intensity data. The log offset is usually depth dependent (TGC), and can be controlled either manually by the user, or automatically controlled by an algorithm in the system. The log scale is typically controlled manually by the user and is generally not adaptive in existing systems. System noise is generally consistent and predictable, so the automatic setting of gain (log offset) by the system can work well in situations where noise is the primary undesirable component (such as deep depth). However, in many cases (and shallow depths), a haze of clutter from chaotic reverberation or sidelobes may be the dominant undesirable component, and this is very dependent on patient and view. The strength of tissue echoes is also very dependent on patient and view. Accordingly, designers and manufacturers of ultrasound systems continue to seek improvements thereto, and specifically to algorithms for configuring the displayed dynamic range of such devices and systems.

SUMMARY

The present disclosure relates generally to ultrasound systems and methods for configuring the dynamic range for display of ultrasound images, for example for B-mode and M-mode imaging. In accordance with the examples herein, an adaptive technique for mapping the full dynamic range to a displayed dynamic range is described.

An ultrasound imaging system according to the present disclosure may include an ultrasound probe operable to detect ultrasound echoes, a display unit operable to display ultrasound images based on the ultrasound echoes, and a processor communicatively coupled to the ultrasound probe and the display. The processor may be configured to receive source image data having a first dynamic range, wherein the source image data comprises log compressed echo intensity values based on the ultrasound echoes detected by the ultrasound probe, generate a histogram of at least a portion of source image data, generate a cumulative density function for the histogram, receive an indication of at least two points on the cumulative density function (CDF), and cause the display unit to display an ultrasound image representative of the source image data displayed in accordance with the second dynamic range.

In some embodiments, the processor may be configured to receive an indication of only two points and to define a linear mapping function based on the two points. The linear mapping function may be used to map a portion of the first dynamic range to the second dynamic range. For example, the processor may be configured to derive a mapping function (e.g., a linear mapping function based on CDFs associated with one or more incoming ultrasound images) to map 16-bit source image data to 8-bit image data for display.

In some embodiments, the processor may be configured to receive an indication of a first point on the CDF, which corresponds to a desired percent of black pixels, and to receive an indication of a second point on the CDF, which corresponds to a desired percent of pixels having a pixel value at or below a mid-gray. The low and high clipping values of the first dynamic range for mapping to a second dynamic range may be derived from the two points. For example, the low clipping value, and thus the minimum value of the second dynamic range, may be based on the first point (e.g., equal to the desired percent of black pixels) and the high clipping value, and thus maximum of the second dynamic range, may be derived from the second point (e.g., if percent mid-gray is specified, the high clipping value may be defined by doubling the pixel value corresponding to the percent mid-gray).

In some embodiments, the ultrasound system may include non-volatile memory, which stores one or more of the inputs to the histogram-CDF process. For example, the memory may stores the desired percent of black pixels and the desired percent of pixels having a pixel value at or below a mid-gray, or any other desired percentages of pixels of certain pixel values.

In some embodiments, the processor may be configured to automatically define second or reduced dynamic ranges for each of a plurality of temporally successive (in some cases, temporally consecutive) ultrasound images based on the same values for the at least two points (e.g., based on the same values for the desired percent of black pixels and the desired percent of pixels having a pixel value at or below a mid-gray stored in memory). As such, while the desired pixel percentiles may not vary from image to image (e.g., in a given imaging application or for a given view), the display may be dynamically or adaptively adjusted for each incoming image based on specific distribution of pixel values in each image.

In some embodiments, the memory (e.g., of the ultrasound system) may store a plurality of pairs of values for the desired percent of black pixels and the desired percent of pixels having a pixel value at or below a mid-gray, each pair associated with a particular clinical application or a standard view associated with the particular clinical application. In some embodiments, the system may further include one or more user controls (e.g., in the form of mechanical or soft controls, such as sliders, knobs, or touch screen controls) configured to adjust the desired percent of black pixels and the desired percent of pixels having a pixel value at or below a mid-gray.

In some embodiments, the processor may be configured to derive depth-dependent mapping functions for mapping image data associated with any one of a plurality of depth bands to the reduced dynamic range. To perform depth-dependent analysis, the processor may divide the source image data into sets of samples associated with a given depth of tissue. These sets of samples, also referred to as lateral (or laterally spatially associated) sets of samples may lie along a straight line or a curved line depending on the physical properties of the transducer (e.g., the geometry of the array, such as sector phased array, curved array, linear array, etc.). In some embodiments, the processor may be configured to divide at least a portion of the source image data into a plurality of depth bands (e.g., lateral sets of samples at a particular depth), generate a histogram and corresponding CDF for each depth band, and define a depth-dependent second dynamic range associated with each depth band. In some embodiments, for example in the case of a sector phased or a curved-linear array, the lateral (spatially associated) sets of samples at a particular depth may include echo intensity data along one or multiple adjacent circular arcs, or a portion thereof. In some examples, e.g., in the case of a linear (non-phased) array, the lateral sets of samples may include the pixel data along a given pixel line or multiple rows of pixel lines, or a portion thereof. In some examples, regardless of the geometric relationship of the source data, depth-related analysis may be performed on a pixel-line basis.

In some embodiments, the processor may be configured to define, using the CDF-based process, a number of depth-dependent second dynamic ranges, and to interpolate between minimum values associated with each of the number of depth-dependent second dynamic ranges and between maximum values associated with each of the number of depth-dependent second dynamic ranges to derive additional depth-dependent second dynamic ranges. In some embodiments, the processor may be further configured to apply time gain compensation to the log compressed echo intensity values (e.g., prior to the histogramming) to produce the source image data. In some embodiments, the processor may be further configured to spatially, temporally, or spatio-temporally filter the source image data prior to generating the histogram A method according to some examples herein may include receiving source image data having a first dynamic range, and generating a histogram of at least a portion of the source image data. The source image data may include log compressed echo intensity values (i.e., echo intensity values after logarithmic compression) generated responsive to echo signals received by an ultrasound probe. The method may further include generating a cumulative density function for the histogram, receiving an indication of at least two points on the cumulative density function (CDF), defining a second dynamic range smaller than the first dynamic range based on the at least two points, and generating an ultrasound image representative of the source image data for display, wherein the ultrasound image is configured to display the source image data in accordance with the second dynamic range.

In some examples, the receiving of an indication of at least two points and defining a second dynamic range may include receiving an indication of a first point and a second point and defining a linear mapping function for mapping a portion of the first dynamic range (e.g., a portion of the pixel values associated with the first dynamic range) to the second dynamic range (e.g., to pixel values associated with the second dynamic range) based on the first and second points. In some examples, the mapping may involve mapping 16-bit source image data to 8-bit image data. In some examples, a first one of the at least two points may correspond to a percentage of pixels in the source image data to be assigned a black pixel value, and wherein a second of the at least two points may correspond to a percentage of pixels in the source image data to be assigned pixel values at and below a mid-gray pixel value.

In some examples, the method may include dividing the source image data into a plurality of depth bands, generating a histogram and a cumulative density function (CDF) of the source image data associated with each band of the plurality of depth bands, and defining a depth-dependent reduced dynamic range for each band of the plurality of depth bands. In some examples, each band of the plurality of depth bands may correspond to a set of lateral set of samples at a given depth. In some embodiments, the lateral sets may lie along a curved line (or circular arc) or along a straight line or row of pixels of an ultrasound image. In other examples, each band may correspond to lateral sets of samples along multiple axially adjacent lines (curved or straight) of pixel data.

In some examples, the at least two points may be retrieved from memory of the ultrasound imaging system. In some examples, the at least two points may be retrieved from a plurality of pairs of input points, based on the imaging application (e.g., cardiac, breast, obstetric, etc.) or based on the image data being associated with a particular view (e.g., a standard cardiac view). In some examples, the method may further include applying time gain compensation to the log compressed echo intensity values to produce the source image data. In some examples, the method may further include filtering the source image data, for example using a spatial filter, a temporal filter, or a spatio-temporal filter, prior to generating the histogram.

The methods according to any of the examples disclosed herein may be embodied in computer readable medium comprising processor-executable instructions, which when executed by a system (e.g., a system configured to display and/or acquire medical images) may cause the system to perform the process embodied in the computer readable medium.

Features from any of the disclosed embodiments may be used in combination with one another, without limitation. In addition, other features and advantages of the present disclosure will become apparent to those of ordinary skill in the art through consideration of the following detailed description and the accompanying drawings.

DETAILED DESCRIPTION

The following description of certain exemplary embodiments is merely exemplary in nature and is in no way intended to limit the disclosure or its applications or uses. In the following detailed description of embodiments of the present systems and methods, reference is made to the accompanying drawings which form a part hereof, and in which are shown by way of illustration specific embodiments in which the described systems and methods may be practiced. These embodiments are described in sufficient detail to enable those skilled in the art to practice the presently disclosed systems and methods, and it is to be understood that other embodiments may be utilized and that structural and logical changes may be made without departing from the spirit and scope of the present system. Moreover, for the purpose of clarity, detailed descriptions of certain features will not be discussed when they would be apparent to those with skill in the art so as not to obscure the description of the present system. The following detailed description is therefore not to be taken in a limiting sense, and the scope of the present system is defined only by the appended claims.

Figure 1A:
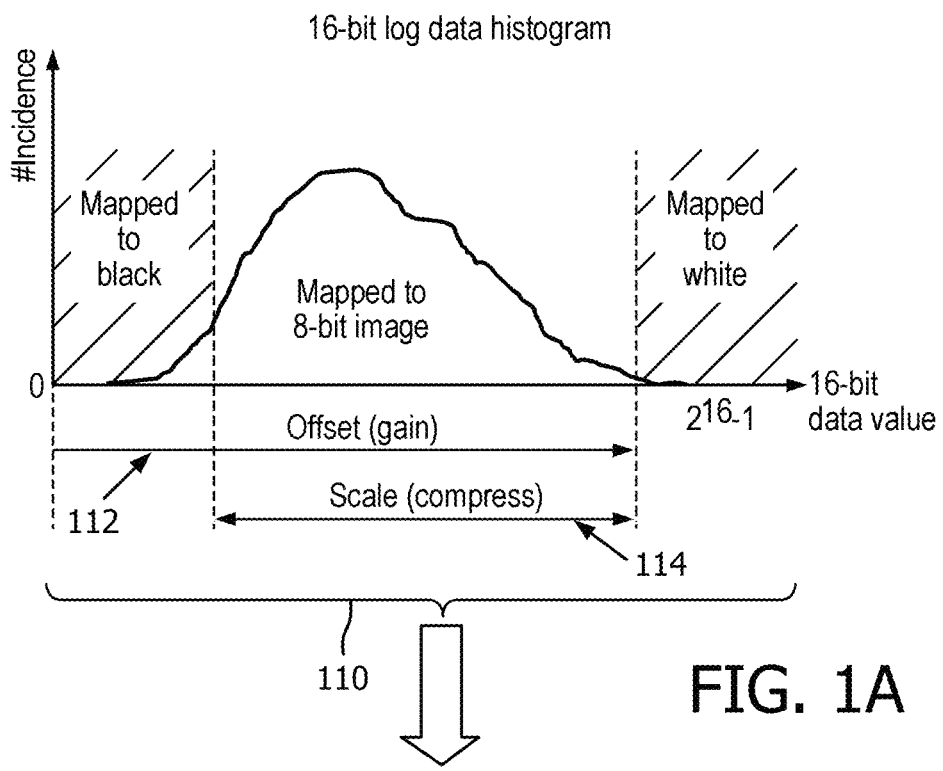
FIG. 1A shows a histogram of the log compressed data for a full dynamic range (e.g., 16-bit) image data.
Figure 1B:
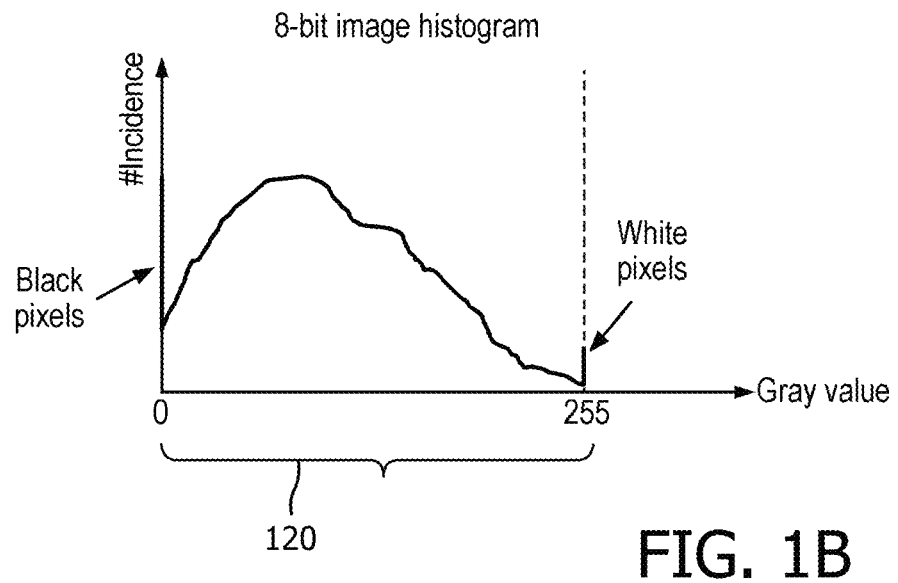
FIG. 1B shows a histogram of the log compressed image data of FIG. 1A but at a reduced dynamic range (e.g., 8-bit).

As shown in FIGS. 1A and 1B, the displayed dynamic range 120 is smaller than the full dynamic range 110 of the echo signals. As shown in FIG. 1B, pixels within the displayed dynamic range are typically shown as shades of gray (i.e., pixels values between 0 and 255), while pixels beyond the displayed dynamic range are shown as saturated white (i.e., pixel value of 255) or black (i.e., pixel value of 0). For an aesthetically pleasing image, usually a significant fraction of the pixels, are black or very dark, especially in cardiac or obstetric applications where a large fraction of the image represents fluid. Usually, a relatively small fraction of pixels (sometimes none) are saturated white.

The displayed dynamic range is defined by applying an offset 112 (e.g., responsive to an input via the "Gain" knob) and scale 114 (responsive to the "Compress" input) to clip the full dynamic range of the log intensity data. As shown in FIGS. 1A and 1B, a 16-bit "full dynamic range" image may be mapped to an 8-bit image for display according to the specified offset (gain) and scale (compress) settings. The Gain and Compress inputs are typically independent of the time gain compensation (TGC) controls, generally provided in the form of 8 sliders, for depth-dependent gain or contrast adjustments. However, even with these controls on existing ultrasound systems, the image may be displayed sub-optimally and/or to obtain an optimal display may require more manual adjustments by the sonographer than may be desired for an efficient workflow.

Figure 2:
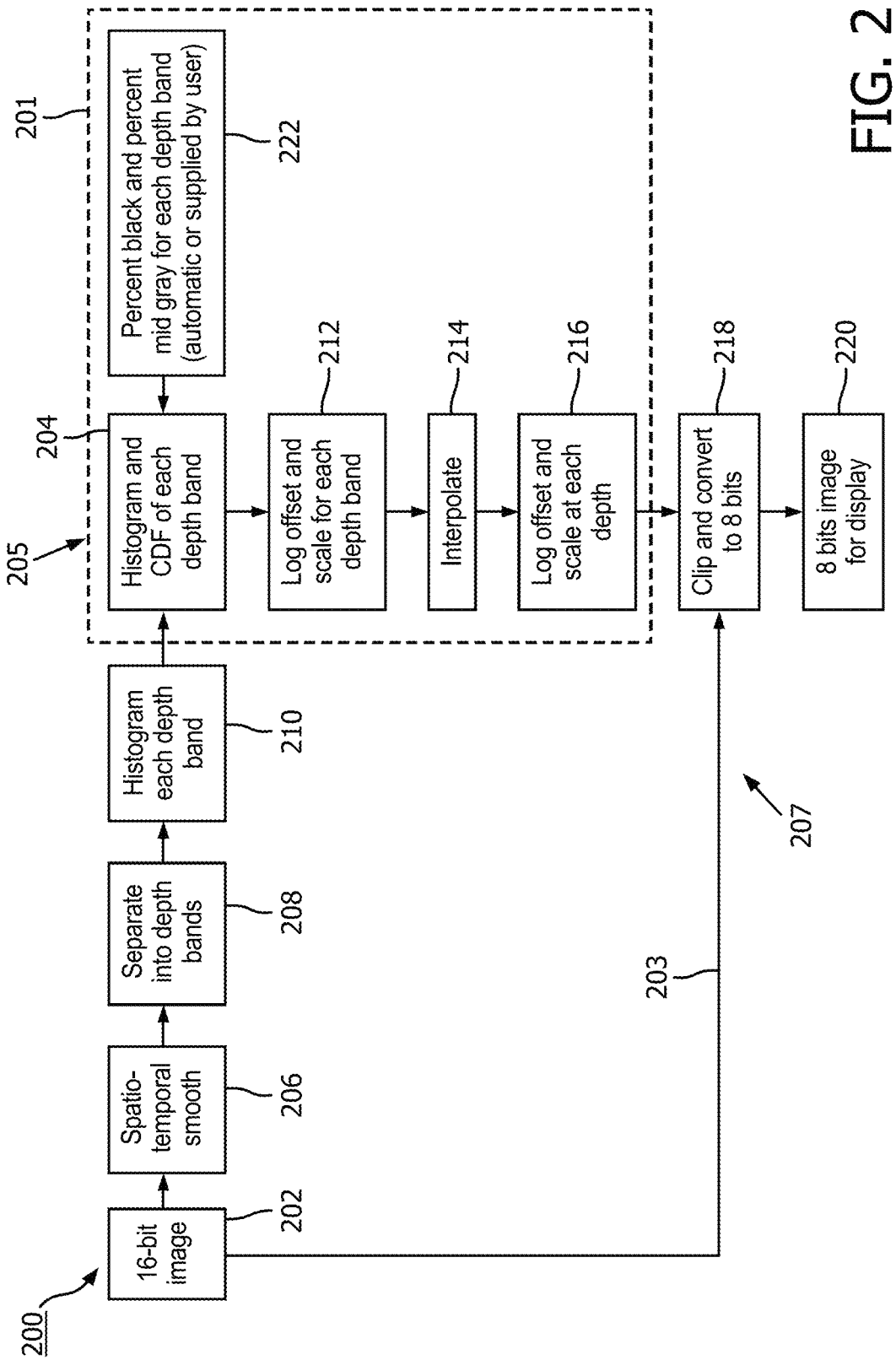
FIG. 2 shows a block diagram of a process for adjusting the dynamic range for display of medical image data.

FIG. 2 shows a block diagram of a process for adaptively adjusting the dynamic range (DR) for display of an ultrasound image in accordance with principles of the present disclosure. The process begins by receiving the full dynamic range image data (block 202), in this example a 16-bit image data. While the example in FIG. 2 is described with reference to 16-bit image data as the source (raw) image data and 8-bit image data as the output image data, it will be understood that the bit sizes in this example are arbitrary and provided for illustration only. It will be understood that this technique can be equally applied to any-sized inputs and outputs, for example 12-bit, 32-bit, 36-bit, or any other integer-based or non-integer-(i.e., floating point) based inputs and outputs. It will be further understood, that while the example illustrates a reduction in the bit-size between the input and output, this is again provided only for illustration. In other examples, the source and the output data may both be of the same size (e.g., 16-bit or other sized input/output) and the treatment applied for adjusting the dynamic range of the image data in accordance with the examples herein is not solely or partially aimed at changing the word sizes of the input and output but is instead generally aimed at affecting the image quality, for example to remove unnecessary data (or clutter) from the source image data before the image data is presented on a display.

As described herein, a treatment 201 may be applied to the source image data (e.g., as shown by arrow 203, to reduce undesired or unnecessary information, such as clutter, in the image. The determination of the treatment 201 to be applied to the source image data involves generating one or more histograms based on the source image data, computing a cumulative density functions (CDF) for each histogram, and defining the minimum and maximum values for the reduced dynamic range (also referred to herein as, dynamic range (DR) for display) based on two or more points on the CDF. In the example in FIG. 2, the source image data (in block 202) is divided into depth bands (as shown in block 208), and a histogram and corresponding CDF are generated for each depth band, as shown in block 204). However, it will be understood that the processes described herein may be performed on the entire source image data without dividing it into multiple depth bands—that is, the treatment 201 may be derived using a single depth band corresponding to the full set of source image data. It will be further understood that the source image data need not be the full set of image data needed to produce a full ultrasound image but may be a portion thereof, such as a portion associated with a region of interest in the image, a portion around the center of the image, a portion along one or more scan lines of the image, or any other portion. Once minimum and maximum values of the displayed dynamic range have been defined based on the CDF, the treatment is applied to the source image data to clip and full dynamic range and produce output image data with a DR for display, e.g., as shown in block 220.

As further shown in FIG. 2, the process 200 may involve several optional steps. For example, the source image data (at block 202) may be initially spatially, temporally, or spatio-temporally filtered (as shown in block 206) to blur or smooth the image. For example, the source image data may be spatially low-pass filtered before histogramming to reduce the intensity variance caused by speckle and noise (e.g., apply histogram blurring). As shown, any such spatial and/or temporal smoothing as shown in the block diagram in FIG. 2, may only be applied to the source data along the analysis path 205, e.g., the signal path associated with defining the treatment 201 to be applied. This filtering may not be applied to the source image data along the image generation path 207, and may therefore not affect (e.g., blur) the image, which is ultimately displayed. That is, once the reduced dynamic range (e.g., DR for display or displayed DR) has been defined at the output of the signal path 205, the treatment 201 (e.g., reduction to the dynamic range) may be applied onto the pre-filtered source image data supplied via signal path 207. In some embodiments, the histograms for two or more temporally successive (not necessarily consecutive) image frames may be temporally averaged to reduce temporal variations prior to computing the CDF, for example in the case of cardiac imaging such temporal averaging may reduce cardiac cycle fluctuations.

As further shown in FIG. 2, the source image data may be optionally divided into depth bands, for example 2, 3, 4, 6, 8, 10, 20 or any other number of depth bands, as shown in block 210. A histogram may be generated for each depth band and a corresponding CDF may be computed for each of the histograms associated with each depth band, as shown in block 204. CDFs may be computed using any known technique, for example, by integrating and normalizing the histograms to obtain a CDF for each histogram that increases monotonically from 0 to 1. A monotonic function, such as a CDF, is obtained from the respective histogram to enable inverse mapping of the variables—that is, a selection of two points along the y axis to obtain two points on the x axis. A different reversible functions may be used other than a CDF in other examples. In the present example, the input or selection of two desired percentage values (e.g., the full black and mid-gray) enables the algorithm to determine the min and max values for the reduced dynamic range. For example, if the full black and mid gray percentages are specified, the algorithm maps the full black percentage from the y axis to the low clipping point (or minimum pixel value, i.e., pixel value to be associated with fully saturated black) on the x axis and further maps the mid-gray percentage from the y axis to the corresponding mid-point pixel value. The high clipping point or maximum pixel value of the reduced dynamic range can then be define as double the mid-point pixel value. For example, in the case of mapping 16-bit image data (denoted by D16) to 8-bit image data (denoted by D8), and where the desired percentiles for full black and mid-gray are denoted by B and G, respectively, an example adaptive linear mapping of the input image data to the output image data may be expressed by the equation:

$$D_8 = \max\left(0, \min\left(255, \text{round}\left(128 * \frac{D_{16} - B}{G - B}\right)\right)\right)$$

A different pair of two input points can be used for a linear mapping according to other examples, or in yet further examples more than two points may be used for a non-linear or piece-wise linear mapping. As will be appreciated, with a linear mapping function, the two input points on CDF can be used to derive the conventional log offset (high clipping point) and scale (low clipping point) values but the process described herein is dynamic or adaptive in that a different offset and scale values may apply to different images by virtue of differences in the cumulative distribution of pixel values between different images. In other words, instead of use the same log offset and scale values and thus the same range of pixel values for the displayed DR for every incoming image (unless manually adjusted by the user), as would be the case in a conventional system, a system according to the present disclosure may use the same percentages of certain pixel values among different images but the resulting displayed DR may differ between images and the distribution of pixel values in any given image may differ.

As described, a histogram and a corresponding CDF may be generated for each of a plurality of depth bands, for example by analyzing or histogramming all of the pixels in a given depth band and the log offset and scale values for each depth in the image may be computationally obtained (e.g., by interpolation between the analyzed samples). In other examples, samples at each pixel line (whether straight or curved) may be independently analyzed, e.g., by generating a histogram and CDF at each depth.

As further shown in FIG. 2 and as described, the process 200 receives, as an input, at least two points on the CDF (see e.g., block 222). In some examples, the two points may be the desired percent of full black and the desired percent mid-gray pixels. That is, a first point may be indicated on the CDF to select the percentage of pixels on the output image, which should be assigned "black" pixel values, and a second point may be indicated on the CDF to select the percentage of pixels, which should be assigned pixel values at and below mid-gray. The two inputs (e.g., full-black and mid-gray levels or percentages) may be used to derive the minimum and maximum values of the reduced DR. For example, the two inputs (e.g., two points indicated on the CDF) may define a linear mapping function for mapping pixel value percentages of the source image to pixel values to be included in the reduced DR, as further described with reference to FIG. 5. In some examples, the two points indicated on the CDF may be other than the full-black and mid-gray percentages, for example, they may correspond to two gray-level percentages, the full-black and full-white percentages, the mid-gray and full-white, or either one of the full-black or full-white inputs and a gray-value input at some intermediate location the mid-value an either of the two fully saturated levels (back or white). In yet further examples, more than two points may be specified and a non-linear or a piece-wise linear mapping may be used to define the minimum and maximum values of the corresponding histogram.

In some examples, the two points specified on the CDF may be converted back to conventional log offset and scale (as shown in block 212), in this case for each depth band but in the case of a single depth band—a log offset and scale to be applied to the DR for the full set of source data. The log offset and scale at each depth band may be interpolated (as shown in block 214) to define log offset and scale at each depth of the source image data. The treatment 201 may then be applied to the source image data, as shown in block 218, to clipping the full DR to a DR for display and produce the output image data for display (block 220). As noted, the dividing of the source image data into depth bands is optional and in some examples, the reduced DR may be defined by operating on the full set of source image data and interpolation may optionally be used to define log offset and scale for the different depths from the log offset and scale defined based on the single histogram and CDF. In yet further examples, the process may be performed at each depth of the image data thus omitting the steps at blocks 212 and 214, although this technique may be more computationally intensive than the example in which a fewer number of depth bands are used for histogramming.

A dynamic range adjustment method, e.g., as described with reference to FIG. 1, may be incorporated in an ultrasound system to provide an adaptive DR adjustment for the display of ultrasound images. In some examples, the ultrasound system may be an imaging system, e.g., comprising hardware and/or software components for ultrasound image data acquisition. In other embodiments, the ultrasound system may be an analysis workstation, e.g., comprising hardware and/or software components for display and/or analysis of ultrasound images, for example a post-acquisition review workstation. The examples herein may be equally applicable to any system configured to display medical images, such as any system configured to acquire and/or display medical images of any imaging modality (e.g., ultrasound, CT, MRI, etc.)

Figure 3:
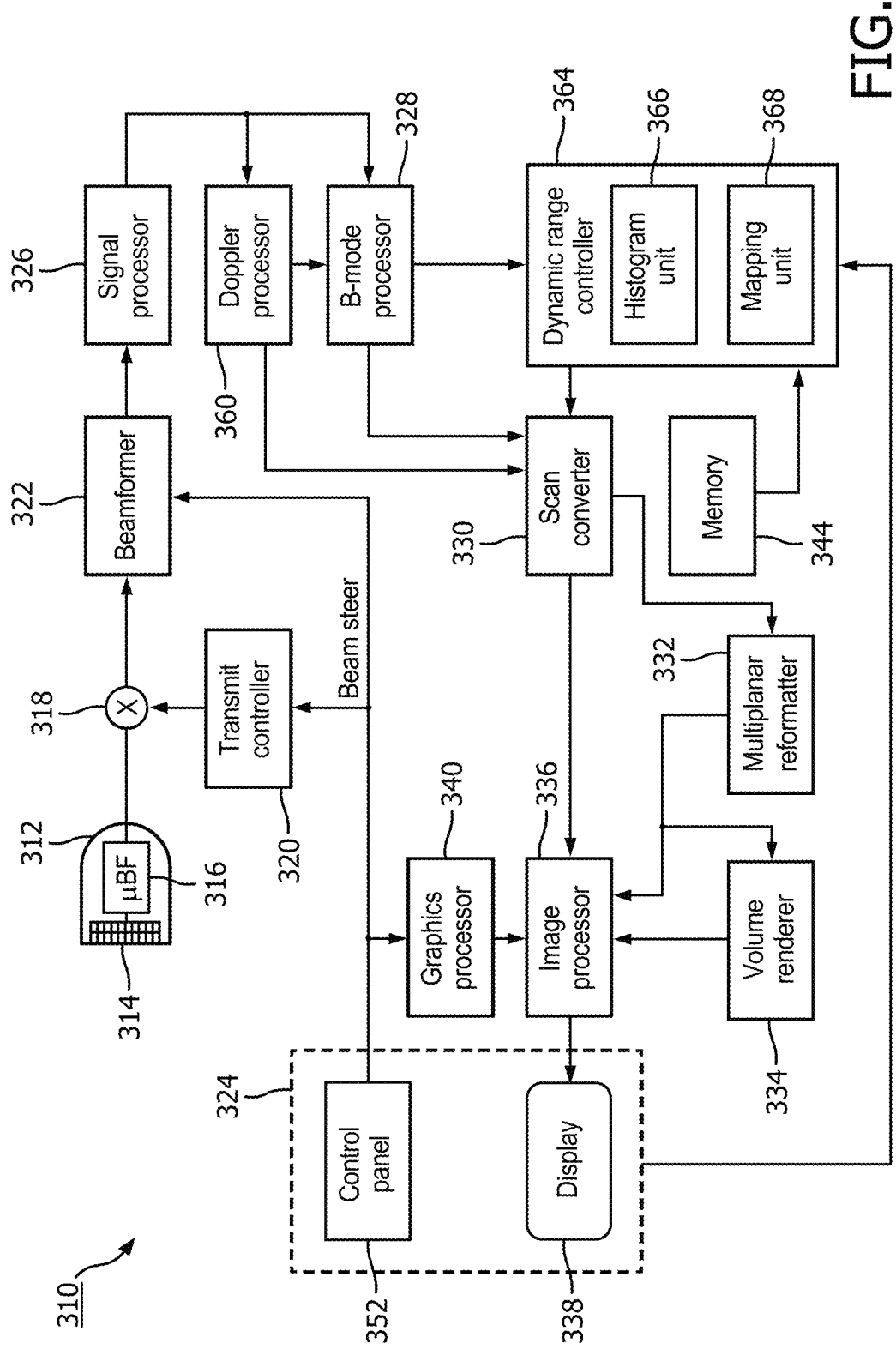
FIG. 3 shows a block diagram of an ultrasound imaging system in accordance with principles of the present disclosure.

FIG. 3 shows a block diagram of an ultrasound imaging system constructed in accordance with the principles of the present disclosure. The ultrasound imaging system 310 in FIG. 3 includes ultrasound probe 312, transducer array 314, beamformer 322 and optionally microbeamformer 316, transmit/receive (T/R) switch 318, transmit controller 320, and one or more processing components for generating ultrasound images from detected echoes. For example, the system 310 may include signal processor 326, B-mode processor 328, Doppler processor 360, scan converter 330, multiplanar reformatter 332, volume renderer 334, image processor 336, graphics processor 340, and others. The system may also include user interface 324, input device 352, and output device 338. The components shown in FIG. 3 are merely illustrative, and other variations, including eliminating components, combining components, rearranging components, and substituting components are all contemplated. For example in an ultrasound system which is configured for post-acquisition display of images (e.g., an analysis workstation) one or more of the components necessary for image data acquisition may be omitted; ultrasound image data may in such cases be received from a storage device, for example a storage server associated with a picture archiving and communication system (PACS).

As shown, the ultrasound imaging system 310 includes an ultrasound probe 312, which includes a transducer array 314 for transmitting ultrasound waves and receiving echo information. A variety of transducer arrays may be used, e.g., linear arrays, curved arrays, or phased arrays. The transducer array 314, for example, can include a two dimensional array (as shown) of transducer elements capable of scanning in both elevation and azimuth dimensions for 2D and/or 3D imaging. The transducer array 314 may be coupled to a microbeamformer 316, which may be located in the ultrasound probe 312. The microbeamformer 316 controls transmission and reception of signals by the transducer elements in the array 314. In the illustrated example, the microbeamformer 316 is coupled to a transmit/receive (T/R) switch 318, which switches between transmission and reception and protects the main beamformer 322 from high energy transmit signals. In some embodiments, for example in portable ultrasound systems, the T/R switch 318 and other elements in the system can be included in the ultrasound probe 312 rather than in a separate ultrasound system base. The ultrasound system base typically includes software and hardware components including circuitry for signal processing and image data generation as well as executable instructions for providing a user interface.

The transmission of ultrasonic pulses from the transducer array 314 under control of the microbeamformer 916 is directed by the transmit controller 320 coupled to the T/R switch 318 and the beamformer 322, which may receive input from the user's operation of a user interface 324. The user interface 324 may include one or more input devices such as a control panel 352, which may include one or more mechanical controls (e.g., buttons, sliders, encoders, etc.), touch sensitive controls (e.g., a trackpad, a touchscreen, or the like), and other known input devices. For example, the user interface may include user controls (hardware or software) for controlling TGC, overall Gain, and other parameters for configuring the display of images. The user interface 924 may include one or more output device, e.g., a display 938 configured to display images.

Another function which may be controlled by the transmit controller 320 is the direction in which beams are steered. Beams may be steered straight ahead from (orthogonal to) the transducer array 314, or at different angles for a wider field of view. The partially beamformed signals produced by the microbeamformer 916 are coupled to a main beamformer 322 where partially beamformed signals from individual patches of transducer elements are combined into a fully beamformed signal. The beamformer and/or microbeamformer may be implemented in hardware, software, or combinations thereof.

The signal processor 326 can process the received echo signals in various ways, such as bandpass filtering, decimation, I and Q component separation, and harmonic signal separation. The signal processor 326 may also perform additional signal enhancement such as speckle reduction, signal compounding, and noise elimination. The processed signals may be coupled to a B-mode processor 328 for producing B-mode image data. The B-mode processor can employ amplitude detection for the imaging of structures in the body. The output of the B-mode processor 328 may be coupled to a scan converter 330, a multiplanar reformatter 332, and/or a volume rendered 334. The scan converter 330 is configured to arrange the image data (e.g., echo intensity signals) in the spatial relationship from which they were received in a desired image format. For instance, the scan converter 330 may arrange the echo intensity signals into a two dimensional (2D) sector-shaped format, or a pyramidal or otherwise shaped three dimensional (3D) format. The multiplanar reformatter 332 can convert echo intensity signals which are received from points in a common plane in a volumetric region of the body into an ultrasonic image (e.g., a B-mode image) of that plane, for example as described in U.S. Pat. No. 6,443,896 (Detmer). A volume renderer 334 may generate an image of the 3D dataset as viewed from a given reference point, e.g., as described in U.S. Pat. No. 6,530,885 (Entrekin et al.).

The system 310 may also include a Doppler processor 360. The signals from the signal processor 326 may be coupled to a Doppler processor 360, which may be configured to estimate the Doppler shift and generate Doppler image data. The Doppler image data may include color data, which may be overlaid with B-mode (or grayscale) image data for display. The Doppler processor 360 may be configured to estimate velocity and power in accordance with known techniques. For example, the Doppler processor may include a Doppler estimator such as an auto-correlator, in which velocity (Doppler frequency) estimation is based on the argument of the lag-one autocorrelation function and Doppler power estimation is based on the magnitude of the lag-zero autocorrelation function. Motion can also be estimated by known phase-domain (for example, parametric frequency estimators such as MUSIC, ESPRIT, etc.) or time-domain (for example, cross-correlation) signal processing techniques. Other estimators related to the temporal or spatial distributions of velocity such as estimators of acceleration or temporal and/or spatial velocity derivatives can be used instead of or in addition to velocity estimators.

Output (e.g., images) from the scan converter 930, the multiplanar reformatter 932, and/or the volume renderer 934 may be coupled to an image processor 936 for further enhancement, buffering and temporary storage before being displayed on an image display 938. In some embodiments, for example, when performing image fusion of 2D real-time ultrasound data with pre-operative image data, the system may include or be communicatively coupled to a source of pre-operative data 968. The 2D images form the scan converter 930 may first be passed through a registration and fusion processor 964 which may be configured to correct for motion-induced misalignment in real-time prior to fusing and sending the combined images downstream, e.g., to the image processor and/or graphics processor. A graphics processor 940 may generate graphic overlays for display with the images. These graphic overlays can contain, e.g., standard identifying information such as patient name, date and time of the image, imaging parameters, and the like. For these purposes, the graphics processor may be configured to receive input from the user interface 924, such as a typed patient name or other annotations. In some embodiments, the system 100 may be configured to receive user input via the user interface 924 for setting parameters of the algorithms described herein. In some embodiments, one or more functions of at least one of the graphics processor, image processor, volume renderer, and multiplanar reformatter may be combined into an integrated image processing circuitry (the operations of which may be divided among multiple processor operating in parallel) rather than the specific functions described with reference to each of these components being performed by a discrete processing unit. Furthermore, while processing of the echo signals, e.g., for purposes of generating B-mode images or Doppler images are discussed with reference to a B-mode processor and a Doppler processor, it will be understood that the functions of these processors may be integrated into a single processor.

In some embodiments, the system 310 may include a dynamic range controller 364, which may be configured to perform functions for adjusting the dynamic range for display of incoming images. The dynamic range adjustments may be performed before scan conversion, e.g., as shown in the example in FIG. 3, or they may be performed downstream, for examples after scan conversion but before further image and/or graphics processing (e.g., addition of annotations, overlays, etc.) of the final image for display. In accordance with principles of the present disclosure, the dynamic range controller 364 may receive the echo intensity data (B-mode image data) from the B-mode processor 328 and may generate one or more histograms and one or more cumulative density functions to define the dynamic range for display. The echo intensity data received by the dynamic range controller 364 may have been previously log-compressed and may have been time gain compensated. Alternatively, time gain compensation may be applied later and/or independent of any adjustments to the DR performed by the dynamic range controller 364.

Figure 4:
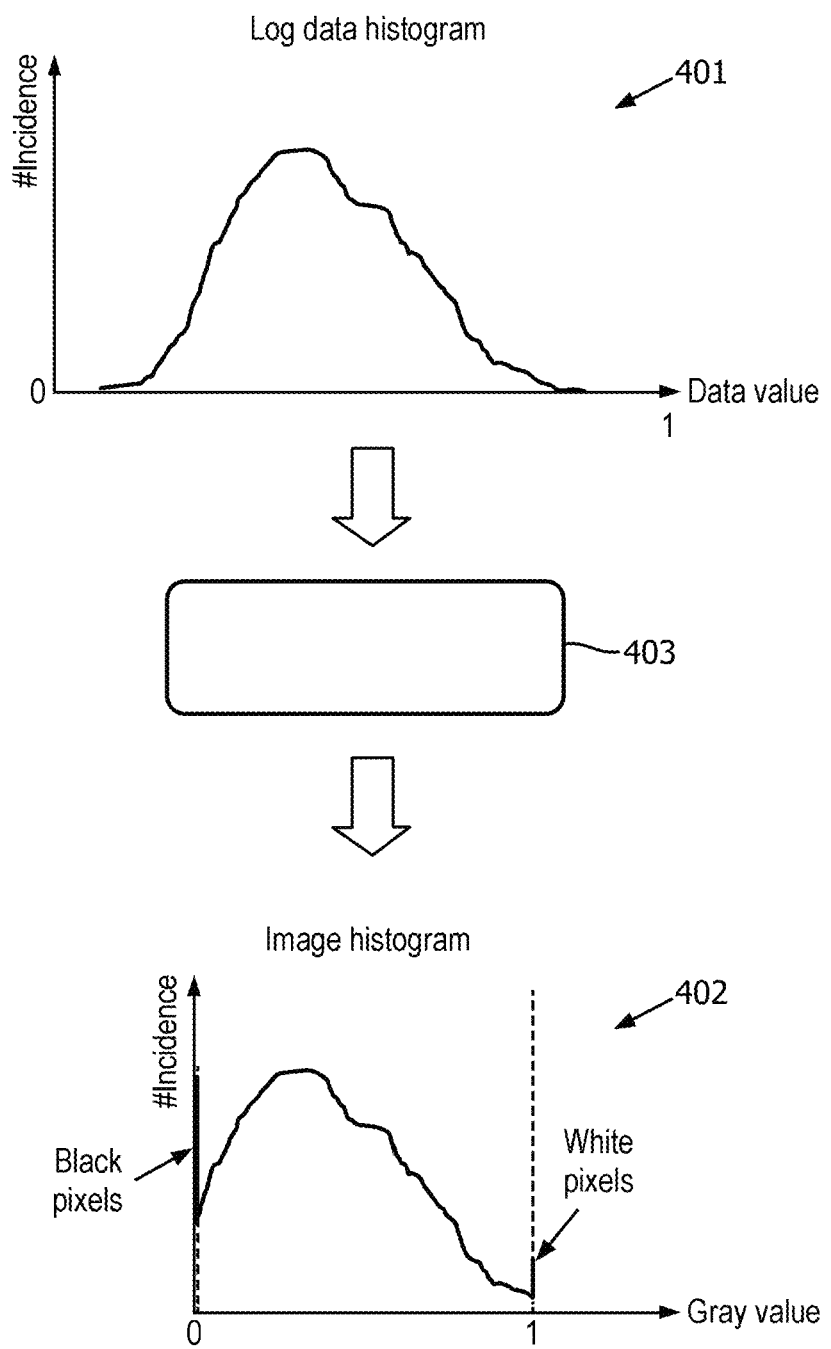
FIG. 4 shows an illustration of a process involving the application of a treatment on an input (source data with full DR) to obtain an output (image data for display with an adjusted DR) in accordance with principles of the present disclosure.
Figure 5:
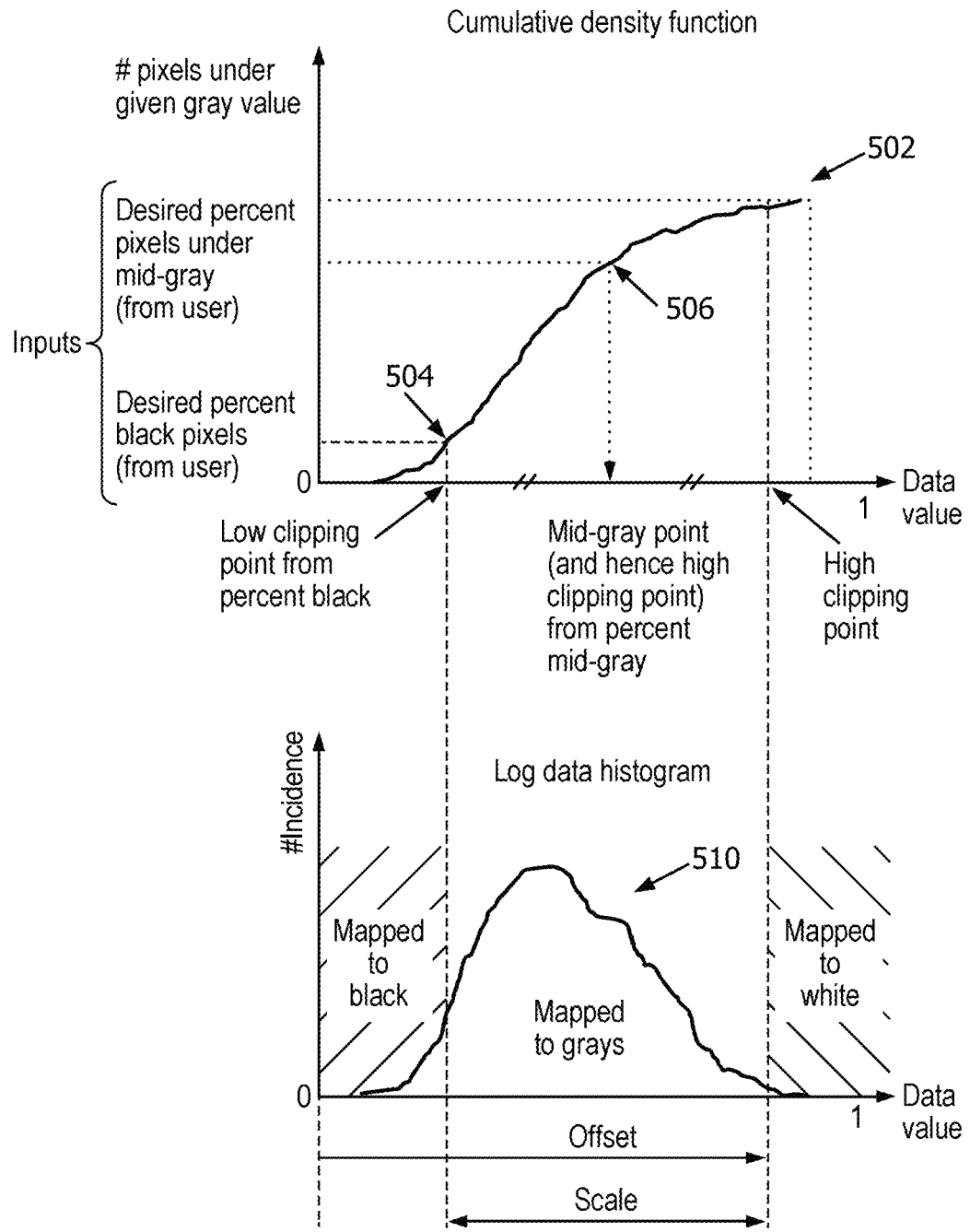
FIG. 5 shows an illustration of a process for determining a treatment to be applied to full DR image data.
Figure 6:
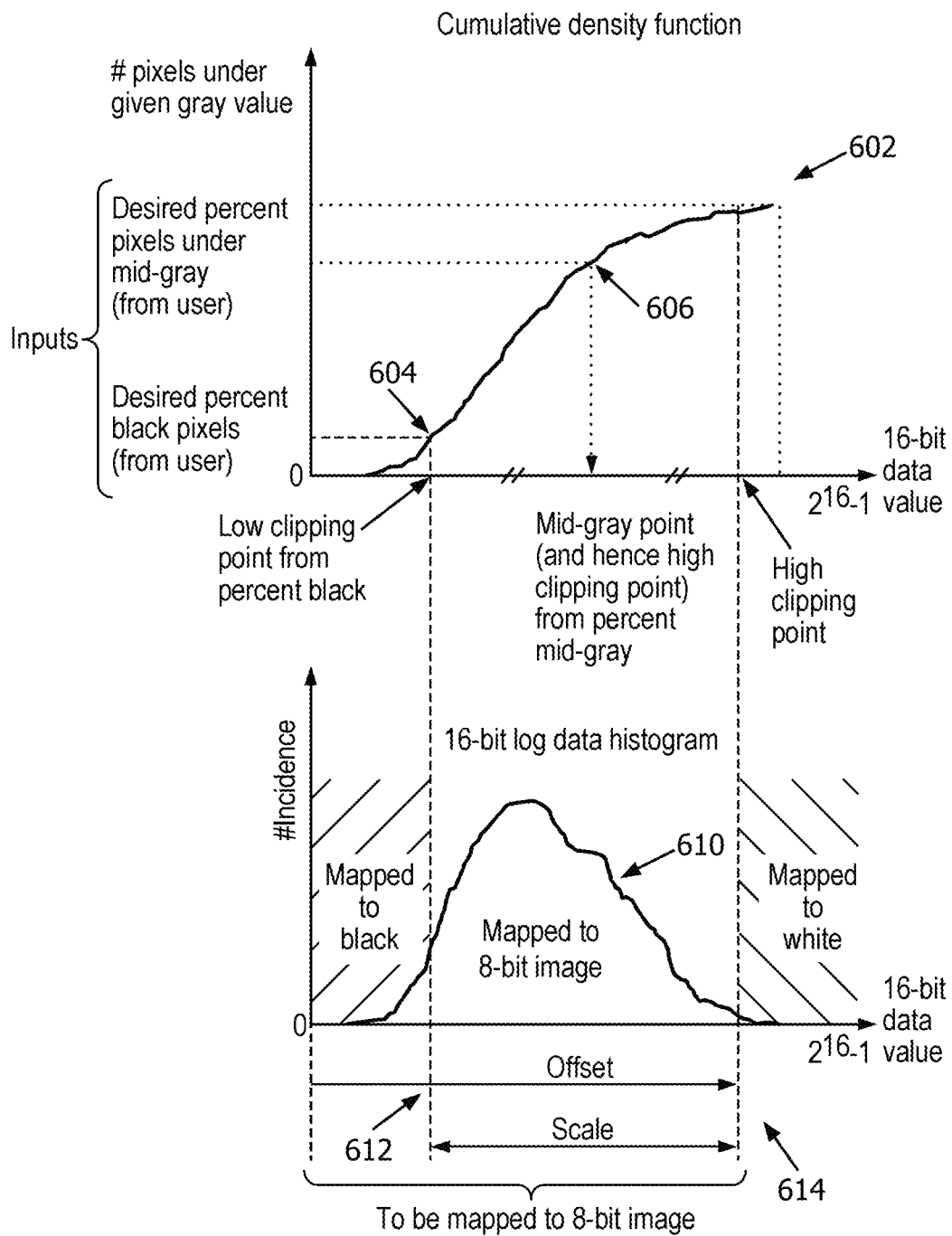
FIG. 6 shows an example of a linear mapping for a 16-bit image data, which can be mapped to 8-bit image data.

The dynamic range controller 364 may be configured to adaptively define and dynamically apply a treatment on incoming images for display. For example, the dynamic range controller 364 may be configured (hardwired or programmed, responsive to executable instructions stored in memory), to perform the process described with reference to FIG. 2. In some examples, the dynamic range controller 364 may include a histogram generation module (e.g., histogram unit 366) and a mapping module (e.g., mapping unit 368). Referring also to FIGS. 4-6, the histogram generation module may be configured to generate at least one histogram based on input data, which may be the log-compressed echo intensity data (also referred to as raw or source image data, or raw or source pixel data). Thus, the output of the histogram generation module may be at least one histogram 401 of the source image data. In some examples, the histogram generation module may generate a plurality of histograms for each image. For example, the source image data associated with any given image may be divided into a plurality of depth bands and a histogram may be generated for each depth band. The histogram generation module may be further configured to compute a cumulative density function associated with each histogram, e.g., CDF 502 as shown in FIG. 5. The mapping module may be configured to define a treatment 403 to be applied to the input data to produce output data (e.g., the reduced DR image data), a histogram 405 of which is show as an example in FIG. 4.

The dynamic range controller 364 may be configured to receive input, e.g., as shown in FIG. 5. The input may include an indication of at least two points (e.g., 504 and 506) on the CDF. In some examples, the inputs may correspond to the desired percentiles of two gray-scale values, for example the percent of pixels associated with full black pixel values and the percent of pixels associated with pixel values at and below the mid-gray pixel value. The indications of the at least two points may be received responsive to user input (e.g., the user specifying, via user interface 324, the desired full black and mid-gray levels) or they may be received responsive to system presets (e.g., desired percentages stored in memory 344). In some examples, the system may store multiple presets, each associated with a specific clinical application, for example for cardiac imaging, fetal ultrasound, or for imaging particular type of tissue or organ such as kidney, liver, breast or other. The presets (pre-stored values for each of the two or more desired percentages) may be derived based on optimization, which may take into account input from clinical specialist as to the optimal way to display an image for any given clinical application or even for a particular view in a given clinical application. In other words, in example systems, many presets may be stored for the different possible clinical applications (e.g., maternal-fetal scan, breast exam, lung ultrasound, etc.) and even for specific views (e.g., any standard view in a given application such as parasternal long axis or short axis views, or apical four chamber view, in cardiography), such that when the system is used to image in that specific clinical application or obtain a standard view the appropriate presets may be applied by the dynamic range controller. As an example only, and without limitation, for cardiac imaging, the desired full black percentage in a given system may be set to around 40% and the mid-gray level may be set to around 85%. Similar values may be used in obstetric imaging, whereas in application where more uniform tissue is being imaged (e.g., liver, breast, lung ultrasound), a smaller percentage of black may be desirable. Other preset values may be used in other examples. It will be also understood that, although the examples herein are discussed in the context of 2D images with associated pixel values, the techniques herein may be equally applicable to 3D image data and corresponding voxel values, thus the term pixel may be generally understood to encompass voxels in the context of 3D imaging. In some examples, a dynamic range controller of an ultrasound system operable to acquire and display 3D image data may be configured to generate histograms and corresponding CDFs for any portion of the 3D image data, for example a portion associated with a region of interest within the volumetric region represented by a frame of the image data, and to map the full dynamic range source data to a reduced dynamic range output data for display in accordance with the principles of the present invention. The techniques described herein may be used to adjust pixel levels for B-mode images extracted from a 3D data set (e.g., MPR views) or it may apply to 3D rendering, where 3D opacity may correspond to 2D image gray levels as described herein.

FIG. 6 shows a process similar to the process described with reference to FIG. 5 but more specifically for the example where 16-bit image data is being mapped to 8-bit image data. In FIG. 6, the cumulative density function 602 generated for any given histogram associated with a 16-bit source image data (or a portion or a depth band thereof) is shown in the upper portion of the figure. A linear mapping function is defined based on the two inputs (e.g., the desired percent black pixels indicated by 604 on the CDF, and the desired percent of pixels at or below mid-gray indicated by 606 on the CDF). The values for the black and mid-gray percentages are used to define the minimum (or low clipping pint, indicated by 612) and the maximum (or high clipping point, indicated by 614) of the full DR, and the pixel values within the full DR that are between the low and high clipping points are then mapped (e.g., equally distributed) to pixel values of the reduced DR (e.g. to produce an 8-bit image). The lower portion of the image in FIG. 6 illustrates this clipping of the full (16-bit) DR image in terms of the well-understood terms of log offset and scale. For the resulting clipped DR, the pixels associated with full DR values below the low clipping point will all be mapped to black (i.e., assigned a value corresponding to black pixel value, or 0 in this case) and the pixels associated with full DR values above the high clipping point will be mapped to white (i.e., assigned a value corresponding to white pixel value, or 255 in this case), with the remaining pixel values in between equally distributed along the range of available values in the reduced DR, in this case distributed from 0-255.

In some embodiments, the system may be configured to apply the appropriate presets automatically (e.g., the user may toggle a ON button to engage the automatic dynamic range adjustment and each image may be automatically enhanced based on the presets, with the toggling of the button to OFF turning off the functions of the dynamic range controller). In some embodiments, the system may, additionally or alternatively, be equipped with one or more user controls for providing input to the dynamic range controller. For example, the user interface may be configured to include one or more user controls (e.g., soft controls such as via touch screen implemented controls, or mechanical controls, such as knobs, dials, buttons, sliders, or the like) to enable the user to specify one or more of the at least two points on the CDF.

Figure 7A:
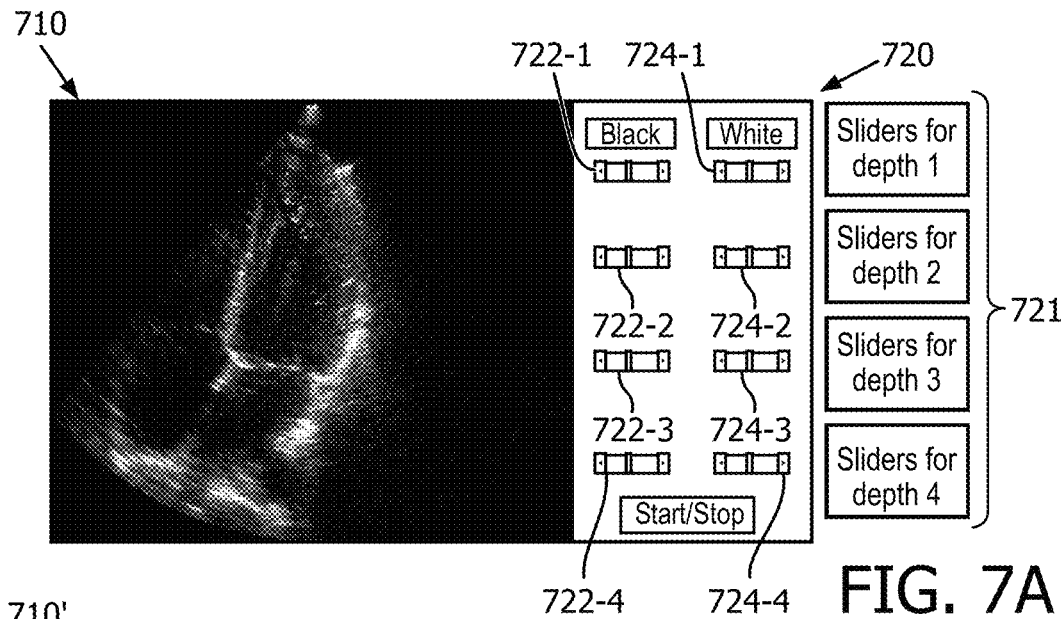
FIGS. 7A, 7B and 7C show examples of a user controls for adjusting the dynamic range for display in accordance with principles of the present disclosure.
Figure 7B:
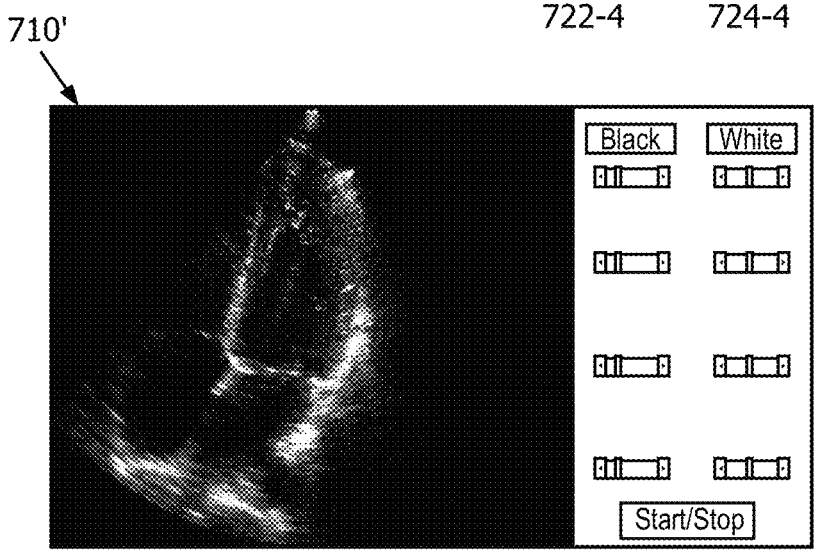
Figure 7C:
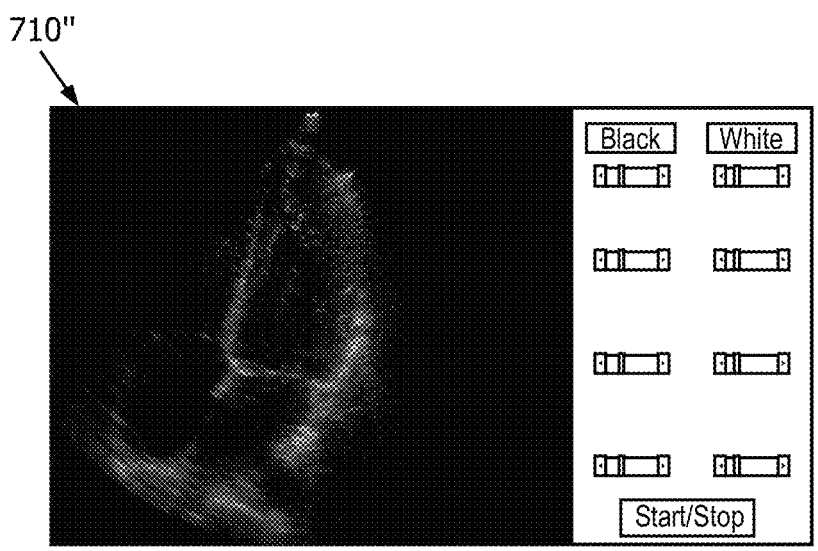

For example, as shown in FIGS. 7A-7C, the user interface may include one or more sliders for adjusting the desired full black and mid-gray levels. FIG. 7A shows a graphical user interface showing a cardiac ultrasound image 710 and a control area 720 on a display of an ultrasound system. The cardiac image 710 in FIG. 7A may be viewed as a reference image, for example an image that may be displayed before the application of any treatment. FIG. 7B shows the same cardiac image after it has been adjusted via the operation of some of the sliders 721 in the control area 720. In FIG. 7B, the image 710' includes more black as compared to the image 710 in FIG. 7A, which has been achieved by the operation of the sliders 722-1, 722-2, 722-3, and 722-4 to increase the percent of black pixels at all depths. FIG. 7C shows the same cardiac image as the reference image after it has been adjusted via the operation of some of the sliders 721 in the control area 720. In this case, the image 710" in FIG. 7C includes less white as compared to the reference image 710 in FIG. 7A, which has been achieved by operation of the sliders 724-1, 724-2, 724-3, and 724-4 to increase the percentile of the mid-gray at all depths. In the example in FIG. 7, four sets of sliders (each including a black level and mid-gray level slider) are shown for each of four depth bands of the image. However, it will be understood that other number of depth bands may be used or the adjustments may be made with respect to a single band. In other examples, different number or types of user controls (or none) may be used. In one example, a user control (e.g., a slider or knob), which operates to reduce clutter, and another user control, which operates to adjust tissue filling, may be used. Operating the reduce clutter control in the direction corresponding to increasing clutter reduction may increase the percent-black level on the CDF, while operating the tissue filling knob in a direction corresponding to increasing tissue filling may decrease the level or percent of mid-gray on the CDF. In other examples, one or more of the inputs to the CDF mapping function (e.g., full black and/or mid-gray) may be at least partially controlled by operation of existing display controls such as the Gain knob and TGC knobs on conventional ultrasound systems.

Referring back to FIG. 5, a linear mapping function may be used to define the offset and scale for the displayed dynamic range for clipping the histogram of the log-compressed image data as shown by plot 510 based on the points selected on the CDF. As shown, the percentage of pixels to be mapped to white may be defined by doubling the span of the input data value (on the horizontal axis) corresponding to the mid-gray level, thus defining the high clipping point or offset. In one specific example, the inputs for black and mid-gray may be 40% and 85%, which may correspond to a span that when doubled provides about approximately 98% of pixels below full white. In other examples, different percentages for the black and mid-gray values may be used.

The pixel values associated with the percentage of pixels in the full dynamic range that fall below the specified full black level will be mapped to black, thus defining the low clipping point or scale. The high and low clipping points may also be interchangeably referred to as the maximum and minimum values of the dynamic range, which define the reduced DR (or DR for display). This process of generating a histogram, computing a CDF for the histogram and defining the boundaries of the displayed DR based on the input points may be repeated at each of a plurality of depth bands and interpolation may be used to derive the reduced DR for each depth associated with the given image. The reduced DR is then applied to the source image data to generate an ultrasound image for display, such that the displayed image includes pixel values only within the reduced dynamic range. The dynamic range controller 364 may perform this analysis (histogram generation and DR adjustment) in the background for each image to be displayed, and the treatment may be applied to the image prior to displaying the image. In this sense, this process may be imperceptible by the user.

For any incoming image, the shape of the histogram may be different (i.e., reflective of differences in the distribution of pixel values in any given image), and thus the mapping to the reduced DR based on the two or more input points relative to a linear (or non-linear) mapping function (such as based on a desired percent black, mid-gray, white or any other pixel level) may thus adaptively adjust each image to provide a more optimal display of the image data. Thus, according to examples of the present disclosure, in B-mode ultrasound imaging, the full dynamic range log data is histogrammed, and desired percentiles are mapped to certain points of the displayed grayscale range, such as full black or mid-gray. As described, the data could be spatially and/or temporally low-pass filtered prior to histogramming to reduce variance due to speckle, noise, or heartbeat. The histogramming and/or the desired percentiles could be a function of depth, e.g., in examples where a histogram is generated for multiple depth bands and corresponding desired percentiles (which may different between depth bands) are applied to each depth band. Histogram-based adaptivity of gain and dynamic range may provide more consistency and robustness than traditional non-adaptive controls. In some examples, after this histogram-based dynamic range adjustment, the percentiles of pixels at certain gray levels may be modified by downstream processing such as scan conversion, adaptive spatial filtering, persistence, or gray maps. Alternatively, these processing steps may be applied upstream on the source image data, e.g., prior to the histogram-based dynamic range adjustment. As described, the desired pixel percentiles may be pre-set or preprogrammed into the system, which may set the values based on automatic view recognition (such as AP4, PLAX, PSAX, etc.), user input, or machine-learning. Additionally or alternatively, the desired percentiles may be user selectable or adjustable (e.g., via one or more knobs, sliders, text input, or other user control) and the preprogrammed setting of a given system (e.g., the desired percent levels) may be further improved over time based on machine-learning.

In view of this disclosure, it is noted that the various methods and devices described herein can be implemented in hardware, software and firmware. Further, the various methods and parameters are included by way of example only and not in any limiting sense. In view of this disclosure, those of ordinary skill in the art can implement the present teachings in determining their own techniques and needed equipment to affect these techniques, while remaining within the scope of the disclosure. The functionality of one or more of the processors described herein may be incorporated into a fewer number or a single processing unit (e.g., a CPU or a GPU) or, alternatively, they may be distributed among a greater number of processing units, and may be implemented using application specific integrated circuits (ASICs) or general purpose processing circuits which are programmed responsive to executable instruction to perform the functions described herein. A computer program (e.g., executable instructions) may be stored/distributed on any suitable computer-readable medium, such as an optical storage medium or a solid-state medium supplied together with or as part of other hardware, but may also be distributed in other forms, such as via the Internet or other wired or wireless telecommunication systems.

It will be understood that any one of the examples, embodiments or processes described herein may be combined with one or more other examples, embodiments and/or processes or be separated and/or performed amongst separate devices or device portions in accordance with the present systems, devices and methods. Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An ultrasound imaging system, comprising:
a processor configured for communication with an ultrasound probe and a display unit, wherein the processor is configured to:
receive source image data associated with ultrasound echoes detected by the ultrasound probe, wherein the source image data comprises a first dynamic range;
generate a histogram of at least a portion of source image data;
generate a mathematical function for the histogram;
receive an indication of a first desired percentage and a second desired percentage respectively corresponding to a first point and a second point on a graph of the mathematical function, wherein each of the first desired percentage and the second desired percentage comprise a different one of: a desired percentage of full-black pixels, a desired percentage of gray-level pixels, or a desired percentage of full-white pixels;
define a first value and a second value of a second dynamic range smaller than the first dynamic range based on the first point and the second point, respectively; and
cause the display unit to display an ultrasound image in accordance with the second dynamic range, wherein the ultrasound image is representative of the source image data.

2. The ultrasound imaging system of claim 1, wherein at least one of:
the first point corresponds to a desired percentage of full-black pixels and the second point corresponds to a desired percentage of gray-level pixels,
the first point corresponds to a desired percentage of first gray-level pixels and the second point corresponds to a desired percentage of second gray-level pixels,
the first point corresponds to the desired percentage of full-black pixels and the second point corresponds to a desired percentage of full-white pixels, or
the first point corresponds to the desired percentage of full-white pixels and the second point corresponds to the desired percentage of gray-level pixels.

3. The ultrasound imaging system of claim 1, wherein the gray-level pixels comprise mid-gray pixels.

4. The ultrasound imaging system of claim 1, further comprising:
the ultrasound probe; and
the display unit.

5. The ultrasound imaging system of claim 1,
wherein the first value of the second dynamic range comprises one of a maximum value or a minimum value, and
wherein the second value of the second dynamic range comprises the other of the maximum value or the minimum value.

6. The ultrasound imaging system of claim 1, wherein the mathematical function comprises at least one of a monotonic function or a reversible function.

7. The ultrasound imaging system of claim 1, wherein, to receive the indication of the first desired percentage and the second desired percentage, the processor is configured to:
receive a user input; or
retrieve the first desired percentage and the second desired percentage from a memory.

8. The ultrasound imaging system of claim 1, wherein the processor is configured to:
receive an indication of the first point and the second point on the mathematical function; and
define a linear mapping function based on the first point and the second point for mapping a portion of the first dynamic range to the second dynamic range.

9. The ultrasound imaging system of claim 8, wherein the processor is configured to use the linear mapping function to map 16-bit source image data to 8-bit image data for display.

10. The ultrasound imaging system of claim 1,
wherein the first point and the second point are along a y-axis of the mathematical function,
wherein the processor is configured to define the second dynamic range by setting a minimum value of the second dynamic range at a pixel value corresponding to a data value on an x-axis of the mathematical function corresponding to the first point,
wherein the processor is configured to determine a data value on the x-axis of the mathematical function corresponding to the second point, and
wherein the processor is configured to further define the second dynamic range by setting a maximum value of the second dynamic range at a pixel value corresponding to double the data value on the x-axis corresponding to the second point.

11. The ultrasound imaging system of claim 1, further comprising memory in configured to store the first desired percentage and the second desired percentage.

12. The ultrasound imaging system of claim 11, wherein the processor is configured to automatically define second dynamic ranges for each of a plurality of temporally successive ultrasound images based on the first desired percentage and the second desired percentage stored in the memory.

13. The ultrasound imaging system of claim 11,
wherein the memory is configured to store a plurality of pairs of values for the first desired percentage and the second desired percentage, and
wherein each pair is associated with a particular clinical application or a standard view associated with the particular clinical application.

14. The ultrasound imaging system of claim 11, further comprising one or more user controls configured to adjust the first desired percentage and the second desired percentage.

15. The ultrasound imaging system of claim 1, wherein the processor is further configured to:
divide at least a portion of the source image data into a plurality of depth bands;
generate a histogram and a corresponding mathematical function for each depth band; and
define a depth-dependent second dynamic range associated with each depth band.

16. The ultrasound imaging system of claim 15, wherein the processor is configured to:
define a number of depth-dependent second dynamic ranges; and
interpolate between minimum values associated with each of the number of depth-dependent second dynamic ranges and between maximum values associated with each of the number of depth-dependent second dynamic ranges to derive additional depth-dependent second dynamic ranges.

17. The ultrasound imaging system of claim 1,
wherein the source image data comprises log compressed echo intensity values based on the ultrasound echoes detected by the ultrasound probe, and
wherein the processor is further configured to apply time gain compensation to the log compressed echo intensity values to produce the source image data.

18. The ultrasound imaging system of claim 1, wherein the processor is further configured to spatially, temporally, or spatio-temporally filter the source image data prior to generating the histogram.

19. A method, comprising:
receiving source image data associated with ultrasound echoes detected by an ultrasound probe, wherein the source image data comprises a first dynamic range;
generating a histogram of at least a portion of source image data;
generating a mathematical function for the histogram;
receiving an indication of a first desired percentage and a second desired percentage respectively corresponding to a first point and a second point on a graph of the mathematical function, wherein each of the first desired percentage and the second desired percentage comprise a different one of: a desired percentage of full-black pixels, a desired percentage of gray-level pixels, or a desired percentage of full-white pixels;
defining a first value and a second value of a second dynamic range smaller than the first dynamic range based on the first point and the second point, respectively; and
causing a display unit to display an ultrasound image in accordance with the second dynamic range, wherein the ultrasound image is representative of the source image data.

20. A non-transitory computer-readable medium comprising processor-executable instructions, which, when executed by a processor of an ultrasound imaging system, cause the processor to perform the method according to claim 19.

* * * * *